> United States Patent Office 3,379,436
Patented Apr. 23, 1968

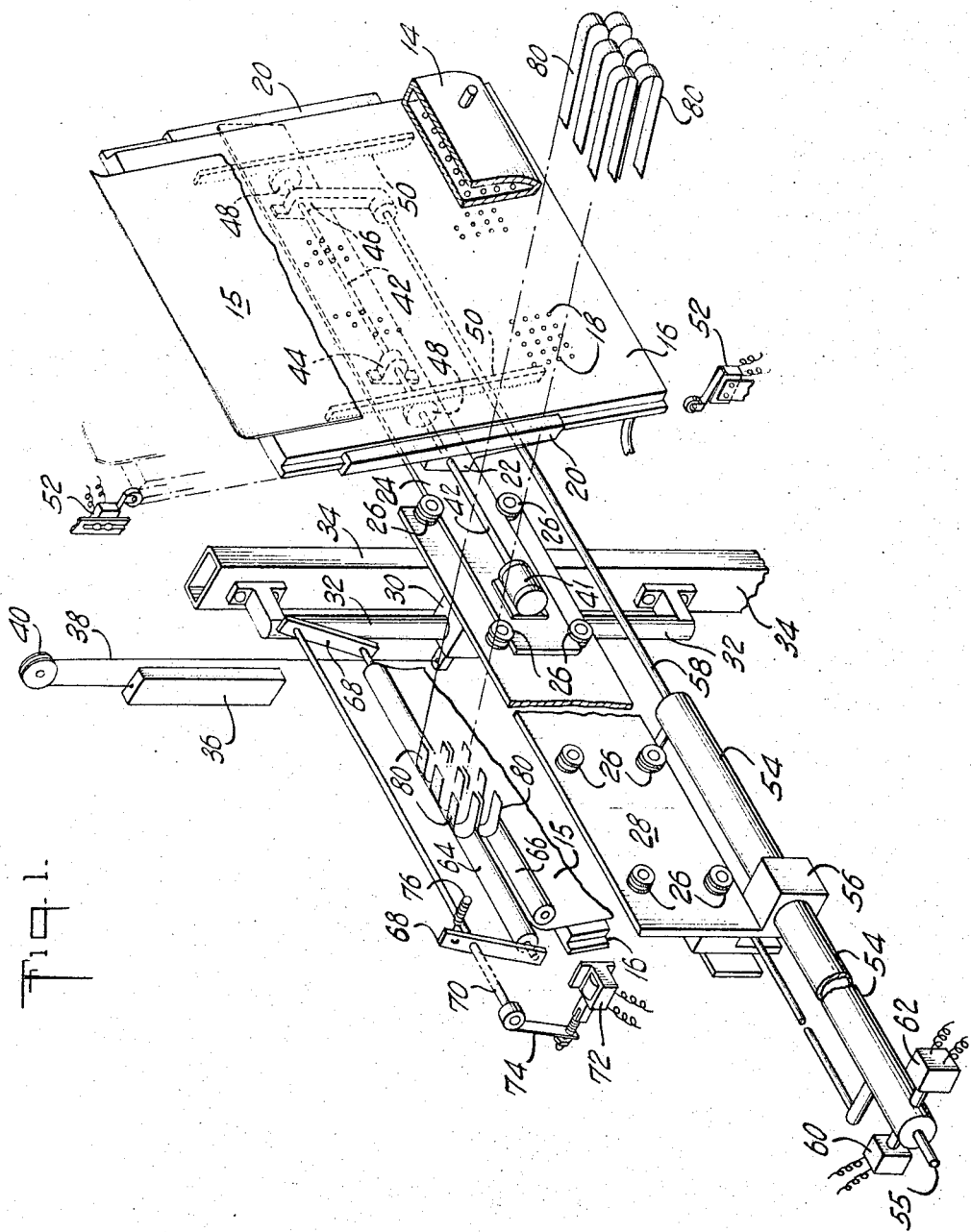

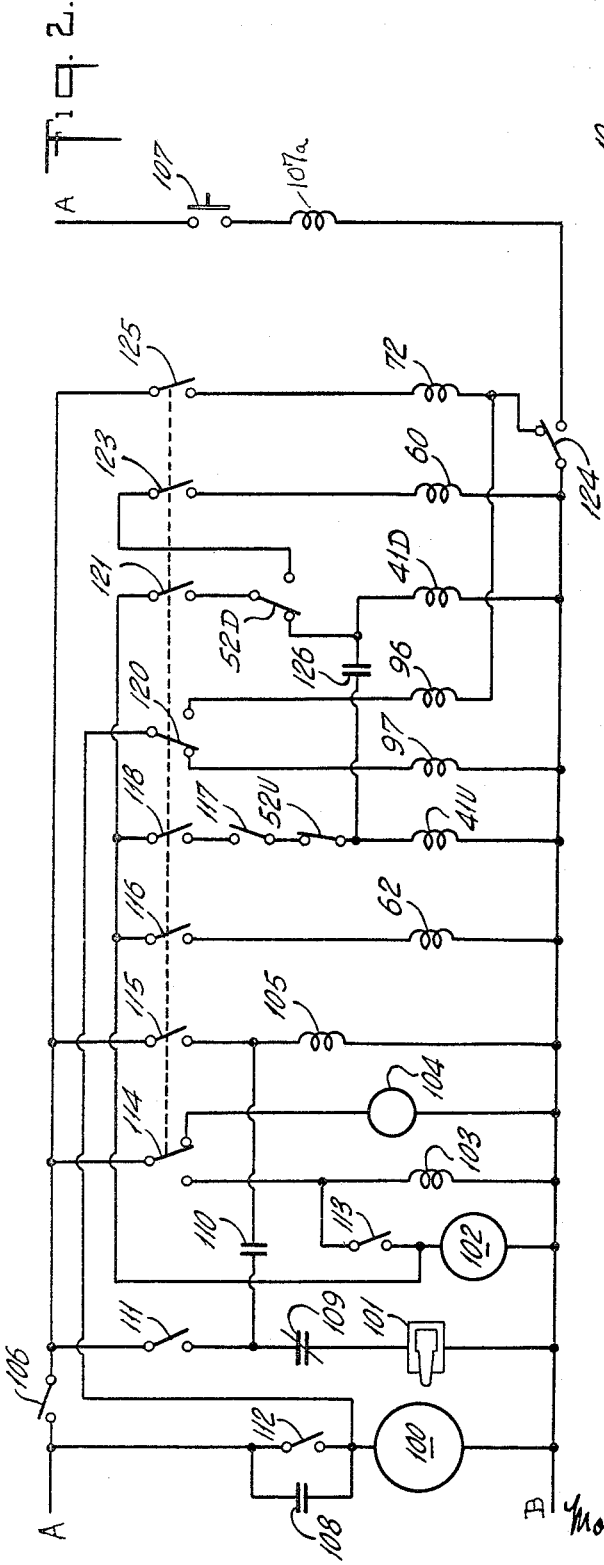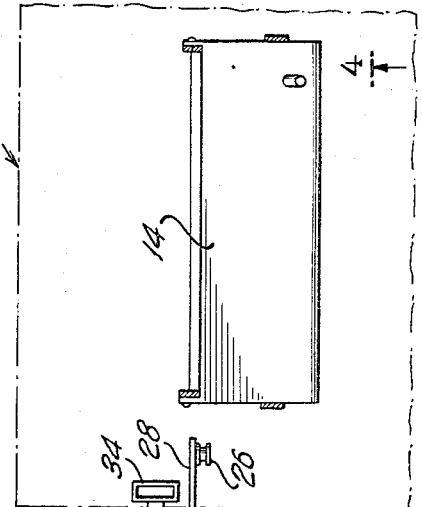

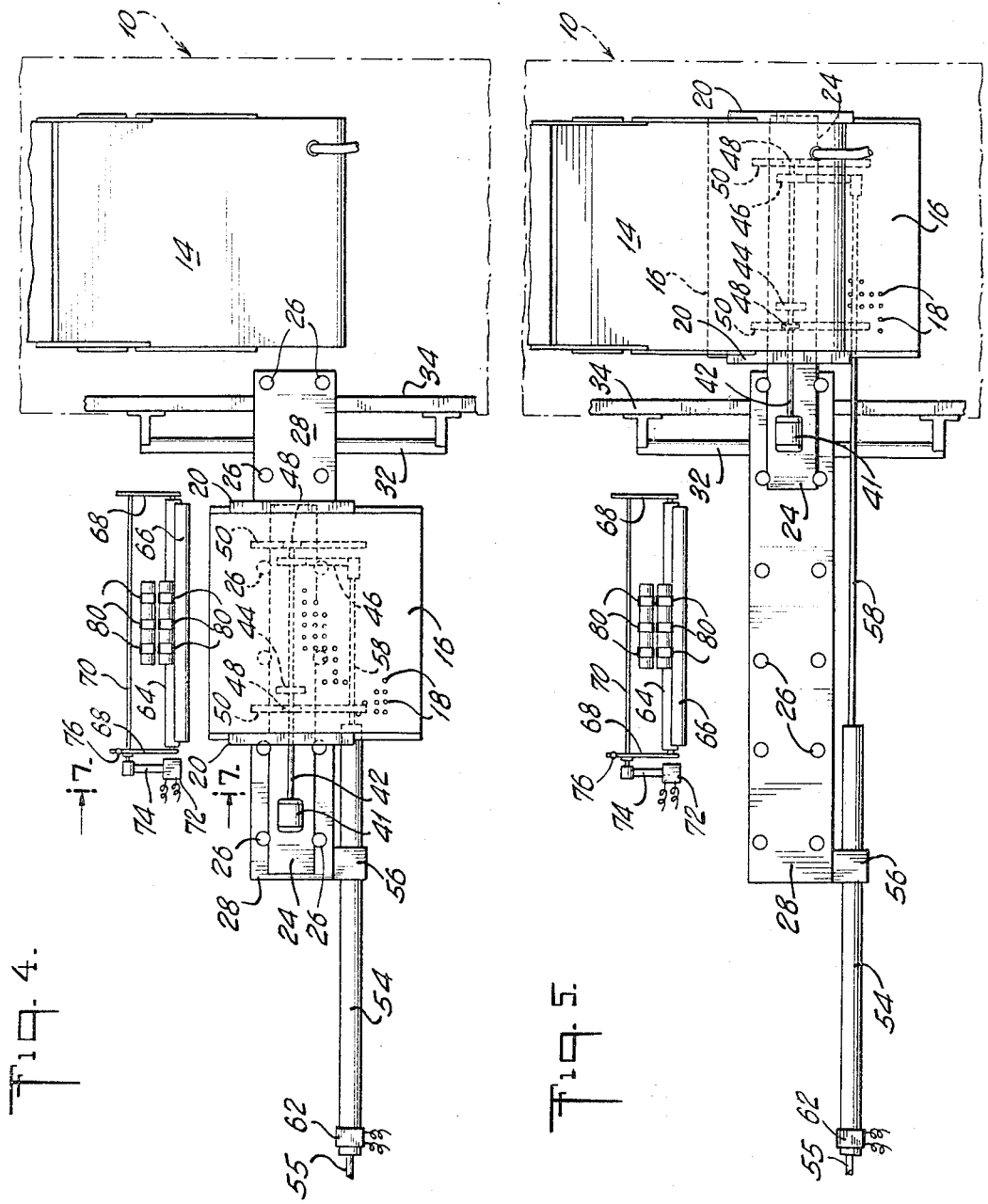

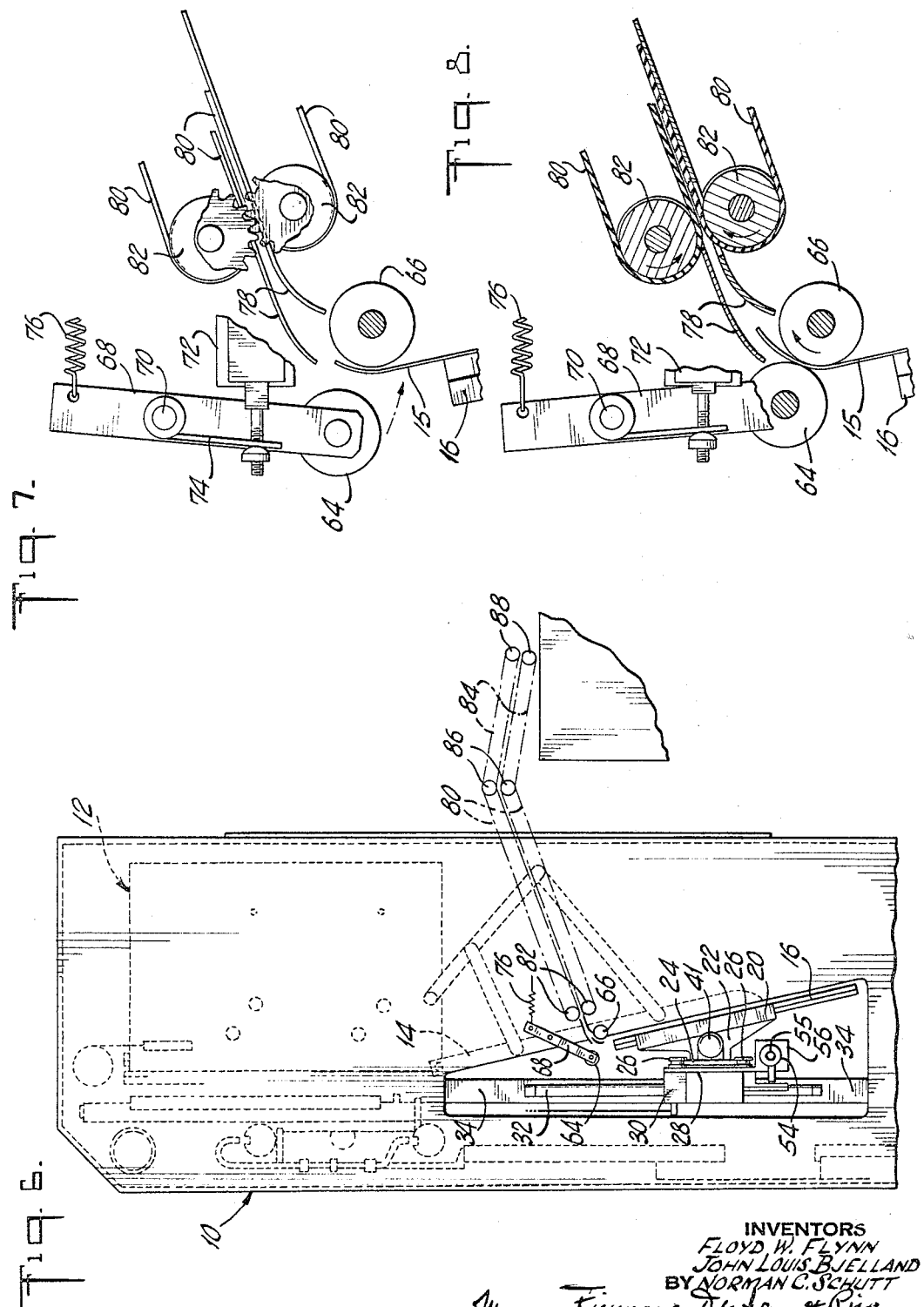

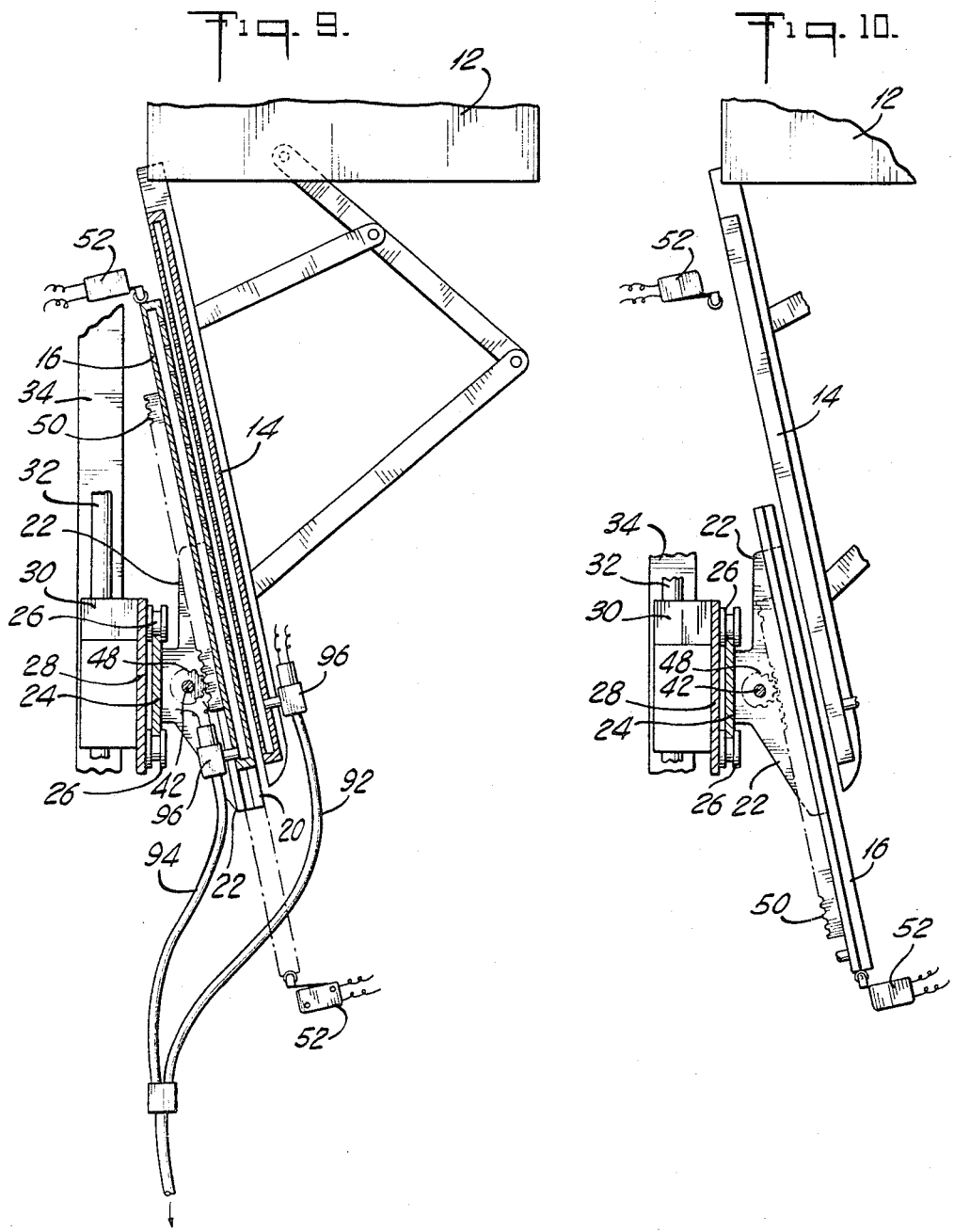

3,379,436
FILM TRANSFER AND DELIVERY APPARATUS
FOR PHOTOMECHANICAL CAMERAS
Floyd W. Flynn, Glen Cove, John L. Bjelland, Glen
Head, and Norman C. Schutt, Glen Cove, N.Y.,
assignors to Powers Chemco, Inc., Glen Cove,
N.Y., a corporation of New York
Filed Dec. 10, 1965, Ser. No. 512,897
5 Claims. (Cl. 271—74)

ABSTRACT OF THE DISCLOSURE

The invention provides apparatus for receiving a sheet of photographic film from the film holding member of a photomechanical camera, for moving the film and delivering it to a processing unit, all of the operations being carried out by remote control of the operator. The camera film holder and the film receiving member both preferably hold the film by vacuum and while the surfaces of the film holder and receiving member are closely adjacent and parallel to each other, the vacuum is discontinued to the film holder as it is applied to the film receiving member after which the film receiving member moves laterally to bring the upper edge of the film between two spaced feed rollers, which then engage the film and feed it out to the processing unit.

---

The present invention relates to a novel and improved apparatus for removing a flat sheet of photographic film from the film support in a photomechanical camera, transferring the film and delivering it outside of the camera, as to a processing unit.

Heretofore, it has been customary in the operation of a photomechanical camera, utilizing relatively large sheets of flexible photographic film, for the exposed photographic film to be released from the support member on which the film was exposed and to drop by gravity into a receptacle in the camera and below the exposure position. This uncontrolled movement of the exposed film is subject to several disadvantages; the possibility of abrasion damage to the emulsion layer of the film, the possibility of the film accumulating dust or other trash which would result in imperfect negatives requiring additional hand work. The invention is also advantageous in saving time and labor, as the film transfer and delivery apparatus may be remotely controlled without requiring the operator to go into the darkroom at the back of the camera to remove the film.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

FIGURE 1 is a schematic view showing the preferred embodiment of the present invention with certain parts shown in two positions;

FIGURE 2 is a schematic circuit diagram of a series of switching and other members for operating the components in a predetermined sequence;

FIGURE 3 is a top plan view of the apparatus illustrated in FIGURE 1;

FIGURE 4 is a sectional view taken on the plane 4—4 of FIGURE 3;

FIGURE 5 is a side elevation showing the parts after the film receiving platen has been moved to another position;

FIGURE 6 is a schematic side elevation, partly in section, showing the film transport mechanism of the present invention in its relation to a conventional photomechanical camera;

FIGURE 7 is a fragmentary side elevation showing the feed mechanism which cooperates to feed the film from its receiving platen to a processing unit;

FIGURE 8 is a similar view showing the manner in which the feed rollers engage the curled end of the film;

FIGURE 9 is a vertical sectional view, with many parts omitted, showing the cooperation of the film receiving and transporting platen of the present invention with the vacuum film holder of a conventional photomechanical camera; and FIGURE 10 is a view similar to FIGURE 9 but showing some of the parts in different relative positions.

The present invention has for its object the provision of a novel and improved accessory for a photomechanical camera using sheet film, by which the exposed sheet of film may be mechanically removed from its exposure position in the camera and transferred and delivered to a processing unit for development and subsequent processing of the film, all by remote control on the part of the camera operator. A further object is the provision of a novel and improved film transfer and delivery unit which avoids the possibility of the exposed emulsion surface of the film from being scratched or otherwise abraded, and which also avoids dropping of the film into the lower portion of the camera which may contain dust or accumulated chips or other trash which are often attracted to the surface of the film and would result in blemishes on the surface of the film as it was subsequently developed and processed. Still another object of the present invention is the provision of a film transfer and delivery unit which is readily adaptable to many existing sheet-film photomechanical cameras without great alteration of the existing camera structure.

As illustrated and described, the sheet film transfer and delivery apparatus is especially adapted for use with the Chemco® photomechanical camera shown and described in the prior patent to Andrew K. Anander, U.S.A. No. 3,068,749, but by suitable modification, it can be adapted for use with other types of photomechanical cameras using sheet film.

The camera includes a film support in the focal plane of the camera which is normally a vacuum back and is adapted to hold a flexible sheet of film for exposure; variable lengths of the film being fed to the vacuum back from an upwardly positioned roll of film, the desired length of film being cut off, and being positioned centrally of the exposure area for exposure in the camera. Heretofore, after the exposure of the film in the camera, the vacuum was discontinued, and the film dropped into a compartment below the exposure area of the camera, from which it was manually removed in the darkroom and then shifted to the development and processing sink. This operation required that the camera operator enter the darkroom, and move the film, or that a second operator remain in the darkroom to handle the film, either alternative contributing to the cost of operation of the camera.

In general, the apparatus of the present invention is adapted to cooperate with the film-holding back of a conventional photomechanical camera, usually a roll-film camera, which is adapted to feed variable lengths of photographic film from a magazine located above the film-holding back, and provided with film severing means by which the desired length of film may be cut from the roll prior to exposure. Such cameras are also usually provided with means for vertically moving the film support up and down so that the film may be centered with respect to the optical axis of the lens.

In such a camera provision is made for rearwardly inclining the film support so that its bottom is swung back slightly from its normal position.

To cooperate with such a camera, the film handling mechanism of the present invention comprises a second vacuum film-holding platen which preferably is inclined at the same angle as the vacuum film support within the camera, when the film support is swung rearwardly after exposure of the film. The vacuum transfer platen is normally positioned laterally of the camera and may be moved laterally to bring it into vertical alinement with the film support within the camera, or moved outwardly so as to completely clear the back of the camera.

The vacuum transfer platen is preferably mechanically operated in its lateral shift movement, and is also vertically adjustable so that it may maintain a relatively constant relation to the film support within the camera, as the film support is moved vertically for different lengths of film fed and cut off from the magazine.

Means are also provided for moving the vacuum transfer platen vertically along an inclined path, so that the upper edge of the platen may be adjusted with respect to the upper end of the film sheet, it being preferable that a short length of the film sheet extend beyond the upper edge of the transfer platen to facilitate subsequent movement of the film sheet.

Valve means are provided for alternatively applying suction to the vacuum film support within the camera or to the vacuum film transport platen, such valve means also serving to bleed air into the vacuum camera back or into the vacuum transfer platen, as the vacuum is discontinued. Thereby, as soon as the vacuum transfer platen has been brought into a position closely adjacent to the vacuum camera back and parallel thereto, the valve mechanisms operate, simultaneously transferring the vacuum from the camera back to the transport platen, and bleeding air to the camera back at the same time that the air bleed to the transport platen is discontinued. With the platen and back in close adjacency, the sheet of exposed film is suddenly and reliably transferred from the camera back to the transfer platen, and securely held with the upper edge of the film projecting beyond the upper edge of the transfer platen.

Due to the natural curl of the freshly unwound roll film, the upper edge of the film projecting beyond the upper edge of the transfer platen, curls slightly upwardly and rearwardly of the camera, while the main body of the sheet film is securely held on the transfer platen by the action of the vacuum.

In this condition, and while the vacuum is maintained on the transfer platen, the transfer platen is moved laterally out of alinement with respect to the camera back, and in so moving the upper edge of the sheet of film is brought into the space separating two out-feeding rollers which are normally slightly spaced apart, the rollers being parallel to the path of movement of the film transport mechanism.

When the film transfer mechanism has reached the end of its return movement, the out-feeding rollers are resiliently urged towards each other, thereby clamping the upper edge of the film, after which the vacuum applied to the film transport platen is released so as to free the film, and the rollers are then driven to feed the film upwardly across the face of the transfer platen and into the bight of upper and lower feed belts which transport the film away from the transfer mechanism onto a receiving surface, or more preferably into the entrance portion of an automatic film processing equipment of conventional construction which will subject the film to the usual operations of development, rinsing, fixing and washing.

Automatic sequencing means are also preferably provided for controlling the lateral movement of the vacuum transfer platen, after completion of the camera exposure, for vertically moving the transfer platen in its inclined plane, for discontinuing the application of vacuum to the camera back and simultaneously supplying vacuum to the transfer platen at the same time that air is bled to the vacuum camera back, for thereafter lowering the vacuum transfer platen, for laterally moving the transfer platen with the exposed sheet of film securely held thereon, to move the curled upper edge of film between the spaced apart out-feeding rollers, for resiliently pressing the rollers together into feeding contact with the upper portion of the film, and for driving the film out-feeding rollers after the application of vacuum to the transfer platen has been discontinued and air has been bled thereto. Thereafter, the film is fed upwardly into cooperating feeding relation with the feed belts, which are preferably driven at the same surface speed as the out-feeding rollers, and in proper timed relation with the feed mechanisms of the processing unit.

It will be understood that the foregoing general description and the following detailed description as well are exemplary and explanatory of the invention but are not restrictive thereof.

Referring now in detail to the present preferred and illustrative embodiment of the present invention, as shown in the accompanying drawings:

The invention is shown in connection with a current model of a Chemco photomechanical camera, more fully illustrated and described in U.S.A. Patent No. 3,068,749. Only the rear portion of the camera is shown comprising the box-like housing 10 within which is contained a film supply magazine 12 containing one or more rolls of photographic film. The film magazine is vertically movable on suitable tracks, and at its under side is pivotally mounted a vacuum, film-supporting back member 14, which may conveniently be of the type shown and described in the prior U.S.A. Patent No. 2,910,265. Film, in the desired length and of the desired width and type, is fed from the magazine 12, adjacent the vacuum, film-supporting back 14 while the back is in its vertical position, the film being fed to the left side (FIGURE 6) of the back, with its emulsion side towards the left and front of the camera. When the desired length of film has been fed, vacuum is supplied to the back member 14, causing the film to be sucked against the front face of the back member, after which the film severing means is actuated to cut-off the length of film 15 to be used. Either before or after the film-feeding operation, the magazine 12 and the vacuum back 14 are preferably vertically adjusted so that the length of film to be exposed is approximately centered with respect to the axis of the camera lens.

With the film smoothly held by the vacuum back 14, and with the film properly in the focal plane of the lens, and in proper relation to the half-tone screen if a half-tone negative is to be made, the film is given the proper exposure or exposures.

After the exposures have been completed, the apparatus of the present invention comes into operation. The vacuum camera back 14 is moved rearwardly to the position shown in FIGURES 6, 9 and 10, by means of a handle (not shown) external to the camera housing 10.

In the embodiment shown, the rear portion of the camera is housed in the darkroom where the film is to be processed, and the lower side wall of the camera at the left of the camera housing 10 (looking towards the camera lens) has been removed, and the apparatus of the present invention is adapted to cooperate with the camera mechanism through the open lower left-hand side of the camera housing.

A film-receiving vacuum transfer platen 16 having a perforated face 18 presenting a flat surface slightly larger than the maximum size of the sheet of film to be handled, is mounted for limited vertical movement in a plane substantially parallel to the inclined position of the vacuum, film-supporting back 14. The film transfer platen 16 may be constructed in accordance with the disclosure of U.S.A. Patent No. 2,910,265. Platen 16 is mounted for sliding movement by means of channel guides 20 which are supported by brackets 22 on slide member 24 which is mounted for lateral horizontal movement by means of rollers 26 on the frame plate 28. Frame plate 28 in turn is mounted for vertical movement by means of sleeve 30 which slides on vertical guide shaft 32 and is mounted on vertical column 34 which also forms one of the frame members of the camera housing. The transfer platen 16 and its supporting members 24, 28 and 30 may thus be moved vertically to adjust them for different vertical positions of the camera back 14, and are counterbalanced by means of weight 36 which is attached to sleeve 30 by means of cable 38 which runs over pulley 40 rotatably mounted on the exterior of the camera housing 10. Thus, the transfer platen 16 may slide vertically in an inclined plane, may move laterally into and out of alinement with the camera back 14, and may be moved up and down in accordance with the vertical position of the camera back. The vertical movement of the transfer platen in its inclined plane is relatively unimportant, and is primarily provided to allow the upper edge of the platen 16 and the overlapping upper edge of the film to clear the frame column 34.

Motor means are provided for sliding the transfer platen 16 in its guideways 20, and for this purpose a reversible electric motor-reduction gear unit 41 is mounted on the face of the slide member 24 and drives shaft 42 journalled in brackets 22, 44, 46 and drives pinions 48 which mesh with racks 50 on the rear face of transfer platen 16.

Limit switches 52 in the motor circuit for motor 35 are mounted to be engaged by the transfer platen 16 in its sliding movement and one or the other of the limit switches is opened as the transfer platen 16 reaches the limit of its movement in one direction or the other, thereby automatically insuring correct positioning of the transfer platen 16 in its active and inactive positions.

Fluid pressure actuated means move the transfer platen 16 and its supporting slide frame 24 laterally, and for this purpose there is provided a relatively long double-acting air cylinder 54 rigidly held by bracket 56 near the outer end of frame plate 28, supplied with compressed air through pipe 55. Within the air cylinder 54 is a piston connected to piston rod 58 which has a stroke equal to the lateral distance to be travelled by the transfer platen 16. Compressed air is supplied to one or the other end of the cylinder 54 under control of solenoid operated valves 60 and 62 so that piston 58 and transfer platen 16 are moved the full distance of their travel in one direction or the other.

As the transfer platen 16 is moved away from the camera vacuum back 14 with the film 15 secure on the perforated surface 18 of the platen 16, the upper edge of the film extends beyond the upper edge of the platen surface and curls slightly towards the vacuum back member 14. As the transfer platen 16 moves towards its film discharging position (towards the left of FIGURE 1) the curled edge of the film is moved into the space between spaced-apart parallel out-feeding rollers 64, 66. Roller 66 is rotatably mounted in fixed journals, not shown, while roller 64 is journalled at its ends in arms 68 which are pivotally mounted by shaft 70 to which they are fixed. Shaft 70 is pivotally moved to bring the roller 64 towards roller 68 to grip the curled end of the film 15 by means of solenoid 72 which is connected to shaft 70 by arm 74 and oscillates the shaft 70 against the tension exerted by spring 76.

Adjacent the bite of rollers 64, 66 are a pair of guide plates 78 forming a feeding throat which leads to conveyor belts 80 driven by rollers 82 which lightly grip the film and convey it to a second series of conveyor belts 84 supported and driven by rollers 86 and additionally supported by rollers 88.

Suitable motor means, preferably variable speed, are provided for driving the rollers 64, 66, and 80, preferably at the same surface speed so that the film is fed from the transfer platen surface to the conventional processing apparatus P at the correct speed for the processing apparatus.

A vacuum pump (not shown) is provided and is connected to the camera vacuum back 14 by hose 92 and to the vacuum transfer platen 16 by hose 94, each hose being provided with a solenoid actuated three-way valve 96 or 97 by which vacuum may be selectively applied to either the vacuum back 14 or the transfer platen, each valve being adapted to bleed air to the back 14 or platen 16 when suction is not being applied thereto, thereby allowing quick release of the film from one or the other of these members.

At the time of exposure, vacuum is applied to the back 14 so as to hold the film in proper exposure position, and after the transfer platen 16 has been moved into transfer position (FIGURES 1 and 9) vacuum is discontinued to the back 14 and simultaneously applied to the platen 16, at the same time that air is bled into the back 14 so as to allow the film to be easily and quickly moved from one surface to the other.

Likewise, at the time rollers 64 and 66 are moved towards each other to grip the upper curled edge of the film 15, vacuum is discontinued to the transfer platen 16 and air is bled thereto, so that the film is free to be moved upwardly without danger of abrasion.

In the drawings, for clarity and simplification, conventional support members, journals and motor drive members have been omitted.

FIGURE 2 of the drawings shows the various electrical parts and the manner in which they are interconnected for operating the various components of the apparatus of the present invention.

Alternating current is supplied from mains A and B. A full cycle of operations is initiated by closure of switch 106, and by feeding the desired length of film into exposure position, followed by exposure of the film in the manner desired. Forward movement of the vacuum back member 14 into the focal plane of the camera allows closure of switch 112 to energize the motor 100 for the vacuum pump serving both the vacuum back 14 and the vacuum transfer platen 16. Relay 108 is a holding relay to continue the current supply to motor 100 until a later time in the cycle.

After completion of the exposure, switch 107 is closed to energize solenoid 107a which unlatches the vacuum back 14 so it may move back to its discharge position, at the same time that solenoid 107a moves switch 124 from its normal position to the position shown in FIGURE 2. Movement of the vacuum camera back 14 to its rearward position also closes switch 113 and closure of switch 111 by manual operation initiates automatic operation of other components of the present invention. Switch 111 allows current to be supplied through normally closed switch 109 to a starting magnet 101 for the sequence timing motor 102. Motor 102 drives a cam shaft which causes the successive operation of a plurality of switches, as will be described.

Operation of the motor driven cams causes a shift in switch 114 so that current is supplied to energize solenoid 103 which is connected to close holding relay 103 until the end of the cycle. At this time, current is also supplied to swiches 116, 118 and 121.

Switch 115 is then closed to energize relay coil 105 which is mechanically connected to close switch 110 and at the same time to open switch 109 which is normally closed, thereby keeping solenoid 105 energized.

All of the circuits are now prepared for further operation of the apparatus of the present invention. The cam mechanism next closes switch 116 which energizes solenoid valve 62 to cause the air cylinder to move the transfer mechanism 16 beneath the vacuum camera back member 14. At the end of its stroke, the air motor 54, 58 closes interlock switch 117, completing the circuit from switch 118, later to be actuated. After switch 117 has been closed, switch 118 is closed by cam action, thereby energizing the motor winding 41U which drives the transfer platen 16 upwardly. When the transfer platen reaches the upper limit of its movement, limit switch 52U is opened thereby stopping motor 41.

Vacuum is still being maintained on the vacuum back 14 until switch 120 is cam-moved to its other position, at which time power is discontinued to the solenoid controlling three-way valve 97. As switch 120 is moved to its other position, power is supplied to solenoid operated valve 96 causing the exposed sheet of film to be transferred from the camera back 14 to the transfer platen 16.

Next, switch 121 is closed to supply power to motor winding 41D to lower the transfer platen 16 until it actuates limit switch 52D, opening the circuit and stopping motor 41. Limit switch 52D as it is actuated by engagement with the transfer platen 16 is shifted to its other position so as to enable switch 123 which is then closed by the cam-actuated timing mechanism to energize solenoid valve 60 to cause a reverse movement of the air cylinder actuated piston 58 to move the transfer platen 16 out of the camera, and shifts switch 124 to deenergize solenoids 96 and 72.

Capacitor 126 is a capacitor for motor 41.

Further operation of the timing cam causes closure of switch 125 after the platen 16 has been returned to its extreme left position, and power is supplied to solenoid 72 to cause the feed rollers 64, 66 to be moved together into gripping relation with the upper curled edge of the film 15.

Closure of the rollers 64 and 66 causes the film to be fed from the apparatus and outward towards the processing mechanism.

Timer motor 102 finally moves switch 114 back to its initial position thereby energizing the ready-light 104 showing that the apparatus is ready for another cycle. Switch 115 also opens and solenoid 105 is energized through switches 111 and 110, and when the vacuum camera back 14 has been returned to the focal plane, switch 111 is opened to shut down the electrical system, so that it is ready for another cycle.

The invention in its broader aspects is not limited to the specific mechanisms shown and described but departures may be made therefrom within the scope of the accompanying claims without departing from the principles of the invention and without sacrificing its chief advantages.

What is claimed is:

1. Film transfer and delivery apparatus for receiving a sheet of film from a camera film holder, removing it from the camera and delivering it to a processing unit, comprising in combination a flat upwardly-extending, perforated film-receiving transfer surface, means for moving said surface into close adjacency to the film holder, means for applying suction to the perforated surface to draw the sheet of film onto said surface and hold it on said surface, a pair of normally spaced feed rollers above the upper edge of said surface, means for moving said surface parallel to the axes of said rollers and away from said film holder and positioning the upper end of said film sheet between said rollers, means for thereafter moving one roller towards the other to grip the film and means for discontinuing the application of vacuum to said surface as the film is moved by said feed rollers.

2. Apparatus according to claim 1 in which the camera film holder and transfer surfaces are vacuum actuated and means are provided for switching the vacuum from the camera film holder to the transfer surface while the holder and transfer surface are adjacent.

3. Apparatus according to claim 1 in which automatic means are provided for sequentially transferring the film from the camera film holder to a transfer surface, laterally moving the transfer surface, releasing the film from the transfer surface and out-feeding the film from the transfer surface.

4. Apparatus according to claim 1 in which the camera film holder is a vacuum film holding surface, the transfer surface is a vacuum actuated film holding surface, with valve means to transfer the vacuum from the first surface to the second surface so that the film is transferred from one surface to the other.

5. Apparatus according to claim 1 in which the film receiving transfer surface and camera film holder are substantially parallel, and are both vacuum actuated, and means are provided for switching the application of vacuum from the camera holder to the transfer surface.

References Cited

UNITED STATES PATENTS

| | | | |
|---|---|---|---|
| 3,040,642 | 6/1962 | Keller | 95—14 |
| 3,179,262 | 4/1965 | Carlson | 271—26 |

EDWARD A. SROKA, *Primary Examiner.*